(12) United States Patent
Sarkar et al.

(10) Patent No.: US 9,591,610 B1
(45) Date of Patent: Mar. 7, 2017

(54) METHOD AND SYSTEM FOR ZONE BASED PAGING BASED ON CONGESTION

(75) Inventors: Debasish Sarkar, Irvine, CA (US); Manoj Shetty, Overland Park, KS (US); Sachin R. Vargantwar, Overland Park, KS (US); Siddharth S. Oroskar, Overland Park, KS (US); Deveshkumar Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1402 days.

(21) Appl. No.: 12/371,165

(22) Filed: Feb. 13, 2009

(51) Int. Cl.
*H04W 68/00* (2009.01)
*H04W 88/02* (2009.01)

(52) U.S. Cl.
CPC .......... *H04W 68/00* (2013.01); *H04W 88/02* (2013.01)

(58) Field of Classification Search
USPC .......................... 455/422.1, 426.1, 466, 450
See application file for complete search history.

(56) References Cited

U.S. PATENT DOCUMENTS

| 5,903,892 | A | 5/1999 | Hoffert et al. |
| 6,104,927 | A | 8/2000 | Willey |
| 6,185,611 | B1 | 2/2001 | Waldo et al. |
| 6,453,353 | B1 | 9/2002 | Win et al. |
| 6,535,745 | B1 * | 3/2003 | Seraj ............................. 455/458 |
| 6,606,645 | B1 | 8/2003 | Cohen et al. |
| 6,980,818 | B2 * | 12/2005 | Harris et al. .................. 455/466 |
| 2003/0086411 | A1 | 5/2003 | Vassilovski |
| 2003/0088615 | A1 | 5/2003 | Good et al. |
| 2004/0205175 | A1 | 10/2004 | Kammerer |
| 2007/0189290 | A1 * | 8/2007 | Bauer ........................... 370/390 |
| 2008/0207227 | A1 * | 8/2008 | Ren et al. ..................... 455/458 |

FOREIGN PATENT DOCUMENTS

| WO | WO 00/65863 | 11/2000 |
| WO | WO 01/47288 | 6/2001 |

OTHER PUBLICATIONS

U.S. Appl. No. 10/613,630, filed Jul. 3, 2003.
TIA/EIA Interim Standard, Upper Layer (Layer 3) Signaling Standard for cdma2000 Spread Spectrum Systems—Release 3, TIA/EIA/IS-2000.5-C, May 2002.
Kwon, et al., "Improved Paging Scheme Based on Distribution Density Information of Users in Mobile Communication Systems," IEICE Trans. Commun., vol. E86-B, No. 4, Apr. 2003.

(Continued)

*Primary Examiner* — Kent Chang
*Assistant Examiner* — Chayce Bibbee (57) ABSTRACT

Disclosed herein is a method for improved paging in a wireless communication system. In a scenario where base stations broadcast congestion indicators to prevent mobile stations from registering in coverage areas that are experiencing threshold congestion, the method provides for a new form of zone based paging that accounts for the possibility that a mobile station has entered into a new zone but has not yet registered due to a threshold congestion state. According to the method, a paging attempt will be directed to the mobile station's zone of last registration and to only those coverage areas in at least one adjacent paging zone that are deemed to be experiencing threshold congestion.

9 Claims, 6 Drawing Sheets

(56) References Cited

OTHER PUBLICATIONS

Handley, et al., "SIP: Session Initiation Protocol," Network Working Group, RFC 2543 (RFC2543), Internet RFC/STD/FYI/BCP Archives, Mar. 1999.
Wahl, et al., "Lightweight Directory Access Protocol (v3)," Network Working Group, RFC 2251—Lightweight Directory Access Protocol (v3), Dec. 1997.
Jini™ Architecture Specification, Sun Microsystems, Version 1.2, Dec. 2001.
Johnston, et al., "SIP Call Flow Examples," Internet Engineering Task Force, Internet Draft, Apr. 2001.
Rosenberg, et al., "SIP: Session Initiation Protocol," Network Working Group, Jun. 2002.

\* cited by examiner

METHOD AND SYSTEM FOR ZONE BASED PAGING BASED ON CONGESTION

BACKGROUND

In a typical cellular wireless communication system, an area is divided geographically into a number of cells and cell sectors, each defined by a radio frequency (RF) radiation pattern from a respective base station antenna. The base station antennae in the cells may then be coupled with a base station controller, which may then be coupled with a switch or gateway that provides connectivity with a transport network such as the public switched telephone network (PSTN) or the Internet.

When a mobile station, such as a cellular telephone, pager, or wirelessly-equipped computer, is positioned in a cell, the mobile station communicates via an RF air interface with the base station antennae of a cell. Consequently, a communication path can be established between the mobile station and the transport network, via the air interface, the base station, the base station controller, and the switch or gateway.

Further, in some wireless communication systems, multiple base stations are connected with a common base station controller, and multiple base stations are connected with a common switch or gateway. Each base station controller may then manage air interface resources for multiple wireless coverage areas (e.g., multiple cells and sectors), by performing functions such as assigning air interface traffic channels for use by mobile stations in the coverage areas and orchestrating handoff of calls between coverage areas. And the switch and/or gateway, in turn, may control one or more base station controllers and generally control wireless communications, by performing functions such receiving and processing call requests, instructing base station controllers when to assign traffic channels, paging mobile stations, and managing handoff of calls between base station controllers.

In general, air interface communications in each sector (or other such coverage area) of a cellular wireless communication system can be encoded or carried in a manner that distinguishes the communications in that sector from communications in adjacent sectors. For example, in a Code Division Multiple Access (CDMA) system, each sector has a respective pseudo-random noise offset or "PN offset" that is used to encode or modulate air interface communications in the sector distinctly from those in adjacent sectors. Analogously, in other air interface protocols, communications in one sector may be distinguished from those in other sectors by frequency, time, and/or various other parameters.

Furthermore, each sector generally has a limited set of resources that can be allocated for use to serve mobile stations in the sector. By way of example, each sector may define an air interface "access channel" on which mobile stations can send "access probes" seeking to originate calls (e.g., voice calls, data sessions, and/or other "calls") or seeking to register their presence in the sector. The access channel may itself have limited capacity. (Further, if multiple access channels are provided, they may cooperatively have limited capacity.) For instance, the access channel may define timeslots in which mobile stations can send access probes and may thus have a limited number of such timeslots. If numerous mobile stations are sending access probes in the same sector around the same time, the access channel of the sector can become congested and can ultimately reach a point where any further attempts to send access probes would result in "access probe collisions" and thus call setup failures (blocked calls) or other registration failure.

As another example, each sector may define an air interface "paging channel" on which the serving base station can send access probe acknowledgements and traffic channel assignment messages to served mobile stations. And the paging channel may similarly have limited capacity. (Further, if multiple access channels are provided, they may cooperatively have limited capacity.) For instance, the paging channel may similarly define timeslots in which the base station can send various messages to particular mobile stations. If the base station has numerous such messages to send, however, the paging channel can become congested and can thereby delay call setup or the like.

As yet another example, each sector may have a limited amount of transmission power for base station transmissions to served mobile stations. That transmission power may need to be divvied among numerous base station transmissions, such as transmissions to specific mobile stations and broadcast transmissions to mobile stations generally. At some point, if there is too much demand for base station transmissions, the power level allocated to particular transmissions may decrease to a point that the quality of the transmissions may suffer.

As still another example, each sector may have a limited number of traffic channels that its serving base station can assign at any given time (e.g., for concurrent use by numerous mobile stations, or for other use). In CDMA, for instance, each traffic channel may be defined by encoding with a particular "Walsh code," yet the sector may have a limited pool of such Walsh codes. Consequently, if more than that number of traffic channels are needed at a given time, the base station would need to reject additional requests for traffic channel assignment, thus blocking calls. Alternatively, in time division multiplex systems, such as TDMA or 1×EV-DO (e.g., the 1×EV-DO forward link for instance), traffic channels may be defined through interleaved timeslots on the air interface. In that case, if more than a threshold extent of air interface communication occurs at once, the base station may be unable to serve additional communications, due to the absence of available timeslots. As a result, communications may be blocked or degraded.

And as yet another example, each sector may have a limited supply of hardware addresses, such as Medium Access Control identifiers (MAC IDs) that its serving base station may assign for use to identify mobile stations operating in the sector. This is typically the case in systems operating according to the 1×EV-DO protocol for instance. If more than a threshold number of mobile stations are operating in the sector at once, the base station may exhaust its supply of MAC IDs and may then be unable to serve additional mobile stations that seek call initiation. Consequently, when additional mobile stations request call initiation, the base station may need to reject their requests, again resulting in blocked calls.

In a typical cellular wireless communication system, the base station of a given sector will broadcast various overhead messages to provide the mobile stations operating in the sector with information that will enable the mobile stations to communicate with the base station. One such message may be an "access parameters message" or the like, which provides information about access channel communication, such as (i) the power level at which a mobile station should transmit an initial access probe seeking to originate a call, (ii) the extent to which the mobile station should increase the transmit power for each successive access probe attempt until the mobile station receives an access probe acknowledgement from the base station, (iii) the length or type of data the mobile station is to include in its access probes, and (iv) the length of each access probe period, among other information.

Another such message may be a "sector parameters message" or "system parameters message" or the like, which provides other overhead information for the sector, such as an identifier of the sector and the geographic location of the serving base station. Of particular interest, the sector parameters message may also provide a "neighbor list" for the sector, which is a list of adjacent sectors, to which the mobile station may hand off. In practice, a base station will broadcast a pilot signal on each of its sectors, to allow mobile stations to detect the presence of the sector. When a mobile station is engaged in a call on a given sector, the mobile station may then scan for pilot signals of the sectors listed in that sector's neighbor list, in search of a strong enough sector to justify handoff. If the mobile station identifies such a sector, the mobile station may then hand off to that other sector.

When a mobile station is in an idle mode, i.e., not currently engaged in an active call, the mobile station may also monitor the pilot signals of various sectors, to determine a best (e.g., strongest) sector in which the mobile station should operate. Once the mobile station identifies such a sector, the mobile station may then read the sector parameters message of the sector to learn more about the sector. And the mobile station may then periodically scan the paging channel in that sector, in search of page messages that would alert the mobile station of incoming calls. Further, when the mobile station then seeks to initiate a call the mobile station would send an access probe on the access channel of that sector. As noted above, the base station may then send an access probe acknowledgement. In turn, the network (e.g., base station controller) may then assign an air interface traffic channel for the call, and the base station may send a traffic channel assignment message via the paging channel to the mobile station. The mobile station may then use the assigned traffic channel to engage in the requested call.

When a switch in a cellular wireless communication system seeks to page a mobile station (e.g., for an incoming call or for some other reason), the switch can send the page message to numerous base stations in the switch's coverage area, with the hope that when the base stations broadcast the page message, the mobile station will receive the page message in one of the associated sectors and will respond. Given the scarcity of paging channel resources, however, most modern cellular networks are instead arranged to engage in a more targeted paging process known as "zone based paging."

With zone based paging, a cellular network is divided into paging zones, each with a respective zone ID, and paging is performed on a zone-basis. To facilitate this, each base station in the system may broadcast as one of its overhead parameters the zone ID for the zone in which the base station is located. Mobile stations operating in the network may then programmatically monitor the zone IDs indicated in the overhead messages and may automatically register with the network when they detect that they have moved into a new zone, or for other reasons. To register with the network, a mobile station may send a registration message via the access channel in its current sector, and a switch in the network would note the mobile station's registration and convey an indication of the registration to a home location register for later reference.

With this process, the registration records thereby maintained by switches and/or home location registers will indicate the paging zone in which each mobile station last registered. When a switch seeks to page a mobile station, the switch may then efficiently send the page message to just those base stations that are within the zone of the mobile station's last registration, as it is likely that the mobile station is in that zone. Further, the switch may send the page message to the base stations in zones adjacent to the mobile station's zone of last registration, to cover the possibility that the mobile station has moved to a new zone but has not yet registered its presence in the new zone. Once the designated base stations transmit the page message, if the mobile station does not respond to the page, the switch may then broaden the scope of the page, by sending the page message to a wider range of paging zones and perhaps ultimately to all base stations in the switch's serving area.

OVERVIEW

As noted above, it is possible that a mobile station may send an access probe on a selected sector and then experience a call setup failure as the serving base station rejects the call request due to a lack of resources in the sector. Unfortunately, such an occurrence can result in a poor user experience, as the device may be unable to initiate the requested call or as excessive delay occurs while the device attempts to initiate the requested call on another sector after failing to set up the call on the selected sector.

One solution that problem is to have a base station monitor resource availability in a given sector and, when the resource availability drops below a threshold level, set a congestion-indicator in an overhead message to alert mobile stations in the sector that the sector is busy, so that the mobile stations should not seek to register in the sector. Mobile stations detecting a strong pilot signal from the sector may then conveniently read the flag in the overhead message and determine that the sector is busy and therefore that they should not register in the sector. The mobile stations may thus advantageously not register in the sector even if the sector provides a new zone ID. Instead, the mobile station may stay registered in their current paging zone.

With this solution, however, an interesting problem arises: If a mobile station moves from paging zone A to an adjacent paging zone B and sectors in zone B are highly congested and are thus broadcasting a congestion-indicator, the mobile station will not register in zone B. However, the mobile station will be located in zone B and will be monitoring paging and other control channels in a sector of zone B. Thus, if a switch performs zone based paging by paging the mobile station in its zone of last registration (zone A), the page may not reach the mobile station.

As noted above, the switch performing zone based paging in zone A may further page the mobile station in adjacent zone B to account for the fact that the mobile station may have moved from zone A to zone B but not yet registered its presence in zone B. Unfortunately, however, paging a mobile station throughout adjacent zone B may unnecessarily emit the page in numerous sectors of zone B even though the mobile station is unlikely to have reached those sectors. This process may therefore unnecessarily increase paging channel congestion in potentially numerous sectors of zone B.

A better solution for paging in adjacent zone B, as disclosed herein, is to have the switch page the mobile station in just those sectors of zone B that are experiencing a high level of congestion. The reason for this solution is that, as a mobile station moves into zone B from zone A, the mobile station will register once it reaches a sector that is not broadcasting a congestion indicator, i.e., a sector that is not experiencing a high level of congestion. Until the mobile station reaches such a sector, the congestion indicator(s) broadcast in zone B will prevent the mobile station from registering in zone B.

For instance, if the first sector the mobile station reaches in zone B (a sector directly adjacent to zone A) is broadcasting a congestion indicator, the mobile station would not register in that sector. Thus, when the switch performs zone based paging of the mobile station, it would be worthwhile for the switch to page the mobile station in zone A and in that first sector of zone B, to cover the possibility that the mobile station had moved to that sector but not yet registered its presence in zone B. In turn, if the mobile station then moves to a second sector of zone B and that second sector is also broadcasting a congestion indicator, the mobile station would not register in that second sector either. Thus, when the switch performs zone based paging of the mobile station, it would be worthwhile for the switch to page the mobile station in zone A and in both the first and second sectors of zone B, as both of those sectors in zone B are congested and could have prevented the mobile station from registering.

In a simple implementation of this process, when the switch makes an attempt to page a mobile station, the switch may send the page message for broadcast in the mobile station's zone of last registration and in each adjacent zone in just those sectors that are known to be congested and thus to be preventing mobile station registration. In a more complex implementation, the switch may take into consideration where the sectors are located in the adjacent zone, and may limit the paging in the adjacent zone to be in just those sectors in the adjacent zone (i) that are experiencing high congestion and (ii) that are on the border with the zone of last registration or that are connected with the zone of last registration by only sectors that are also experiencing high congestion—so that there would be a possibility that a mobile station may have moved through the adjacent zone but only so far within sectors that are experiencing high congestion and thus preventing mobile station registration.

These as well as other aspects, advantages, and alternatives will become apparent to those of ordinary skill in the art by reading the following detailed description, with reference where appropriate to the accompanying drawings.

DETAILED DESCRIPTION

Referring to the drawings, as noted above, FIG. 1 is a simplified block diagram of a communications network in which the present method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium (i.e., data storage, rather than a mere signal), to achieve the useful, concrete, and tangible result of helping to avoid or reduce the likelihood of blocked calls.

Figure 1:
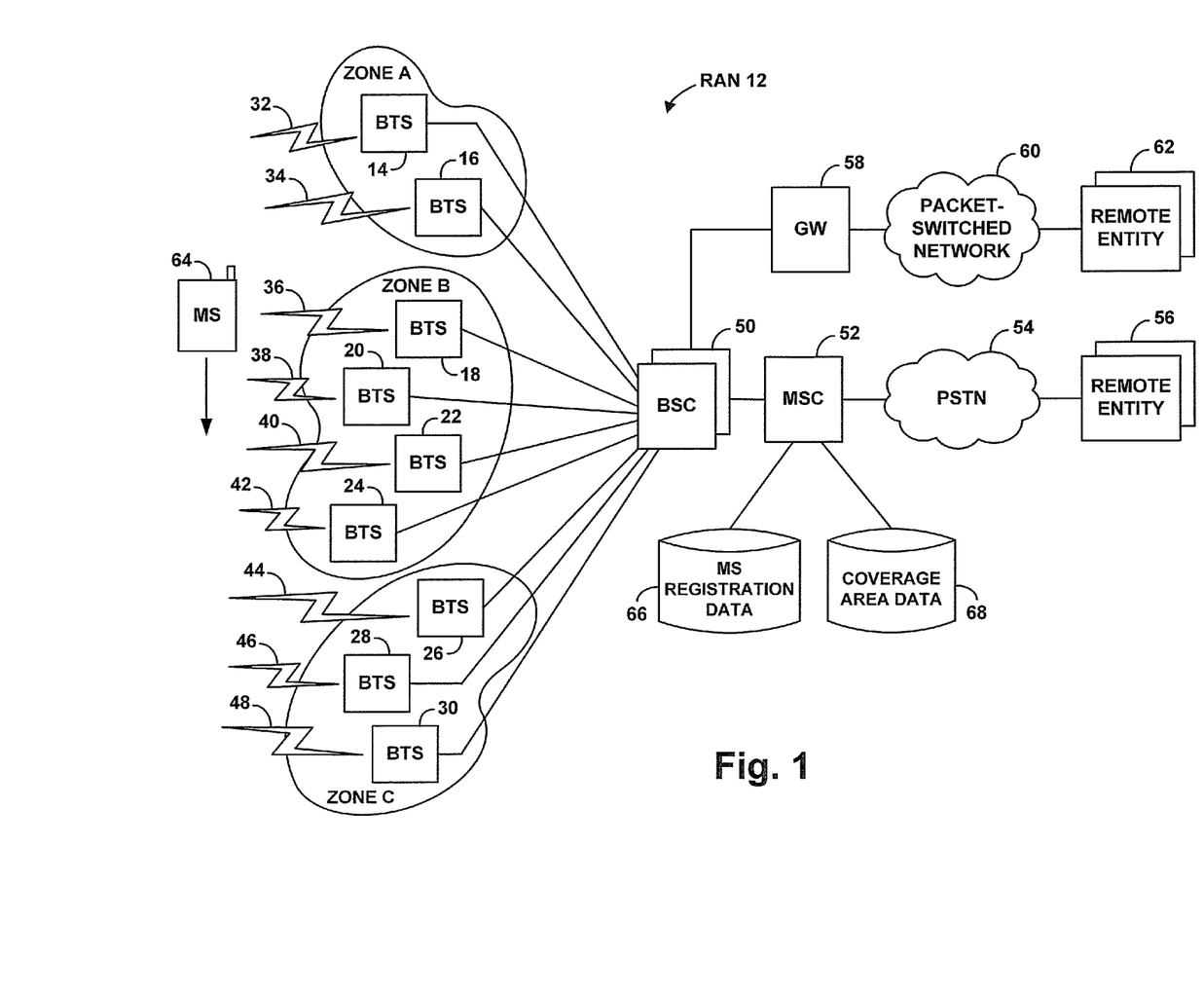
FIG. 1 is a simplified block diagram of a cellular wireless communication system in which the method can be implemented.

As shown in FIG. 1, the exemplary network includes at its core a radio access network (RAN) 12 that radiates to define numerous coverage areas in which mobile stations can engage in RF communication with the RAN. The RAN may define these coverage areas discretely through use of directional antennas and/or by various modulation parameters, including, without limitation, carrier frequencies and PN offsets or other parameters, depending on the air interface protocol used. Example air interface protocols include CDMA (e.g., IS-95, IS-2000, 1×RTT, 1×EV-DO, etc.), iDEN, WiMAX, TDMA, AMPS, GSM, GPRS, UMTS, EDGE, LTE, WI-FI (e.g., 802.11), BLUETOOTH, and others now known or later developed. In practice, the coverage areas may overlap to some extent, so that a served mobile station can move seamlessly from one coverage are to another.

The RAN can take various forms and may include any of a variety and number of components, depending for instance on the air interface protocol employed by the RAN. As such, the RAN may vary in degree of complexity, from a simple wireless access point router to a more complex system such as that shown for instance.

As shown, the RAN may include numerous base stations (also known as base transceiver stations or BTSs), designated in the figure as base stations 14-30 and one or more base station controllers 50 (which may be integrated with one or more of the base stations). The base stations preferably include directional antennas, power amplifiers, and associated transceiver equipment arranged to establish corresponding wireless coverage areas 32-48 as shown and to communicate with mobile stations in those coverage areas.

The coverage areas shown in the figure can be cell sites, cell sectors, or some other defined wireless coverage area (possibly even a combination of coverage provided by multiple base stations). For simplicity, just a single coverage area is shown emanating from each base station, but it is further understood that a typical base station may provide multiple discrete coverage areas, such as multiple cell sectors for instance.

As shown, each base station controller may be coupled with a mobile switching center or other switch 52 that provides connectivity with the public switched telephone network (PSTN) 54 if applicable, so that served mobile stations can communicate with remote entities 56 on the PTSN. And each base station controller may be coupled with a packet data serving node (PDSN) or other gateway 58 that provides connectivity with a packet-switched network 60 if applicable, so that served mobile stations can communicate with remote entities 62 on the packet-switched network.

FIG. 1 depicts a representative mobile station 64 by way of example, which could be a cell phone, wirelessly equipped personal digital assistant (PDA), or any other type of wirelessly-equipped device now known or later developed. The mobile station is preferably equipped with hardware, software, and/or other logic to communicate with RAN 12 in accordance with an agreed communication protocol, such as one of the protocols noted above for instance. Further, it is understood that the term "mobile station" does not necessarily mean that the device is movable; the term connotes a wireless communication device generally, whether movable or at a fixed position.

FIG. 1 depicts the base stations grouped into zones A, B, and C, to facilitate zone-based paging as described above. As described above, each base station may broadcast a zone ID indicating its zone, and a mobile station such as mobile station 64 may monitor the zone IDs broadcast in the coverage areas where the mobile station is operating. When the mobile station detects a change in zone ID, the mobile station may then responsively register its presence in the new zone, so that the RAN would then know to page the mobile station in that new zone.

To facilitate this, as shown, MSC 52 includes or has access to mobile station registration data 66 and coverage area data 68.

The mobile station registration data 66 preferably comprises data that specifies per mobile station where the mobile station is currently registered, such as the zone in which the mobile station is currently registered, among possibly other information. The mobile station registration data 66 can take the form of a visitor location register (VLR) database, which holds a record per mobile station in the MSC's service area. The mobile station's current zone of registration can thus be indicated in the mobile station's VLR record. Alternatively or additionally, the mobile station registration data can take the form of a home location register (HLR) database that is accessible by the MSC. Still alternatively, the data may be stored internally at the MSC or elsewhere in some other form.

The coverage area data 68 preferably comprises data that specifies per coverage area (i) what zone the coverage area is in, (ii) what other coverage area(s) are directly adjacent to the coverage area, and (iii) whether the coverage area is currently congested or not.

The zone data in coverage area data 68 could comprise a separate record per zone, listing the coverage areas in the zone, and/or the zone data could comprise a separate record per coverage area, listing the zone in which the coverage area is located. The zone data may be set through manual input by network designers and/or may be dynamically modified based on RF conditions or for other reasons.

The adjacency data may comprise a separate record per coverage area, listing neighboring coverage areas for the coverage area. Such data may comprise a neighbor list for the coverage area, may be based on neighbor list data for the coverage area, or may be generated or structured in some other manner.

The coverage area congestion data may in turn comprise a flag per coverage area indicating whether the coverage area is congested. The flag may take the form of a Boolean value indicating the congestion state of the coverage area, and the flag per coverage area is preferably updated dynamically as the congestion state of the coverage area changes. In practice, when a coverage area begins experiencing threshold congestion, the base station of the coverage area will record that fact in its own data storage and will signal to the MSC, to inform the MSC of the congestion state. The MSC will then update the coverage area data 68 so that the congestion flag for the coverage area indicates that the coverage area is congested, or to otherwise indicate that state. In turn, when the coverage area begins no longer experiencing threshold congestion, the base station will record that fact in its own data storage and will signal to the MSC, to inform the MSC of the change of state. The MSC will then update the coverage area data 68 so that the congestion flag for the coverage area indicates that the coverage area is not congested, or to otherwise indicate that state.

Note that the coverage area data 68 may include other data as well. For instance, if coverage areas could be cells or cell sectors, a coverage area record regarding a cell may specify sectors of the cell, and a coverage record regarding a sector may specify the cell of which the sector is a part. Other examples are possible as well.

Figure 2:
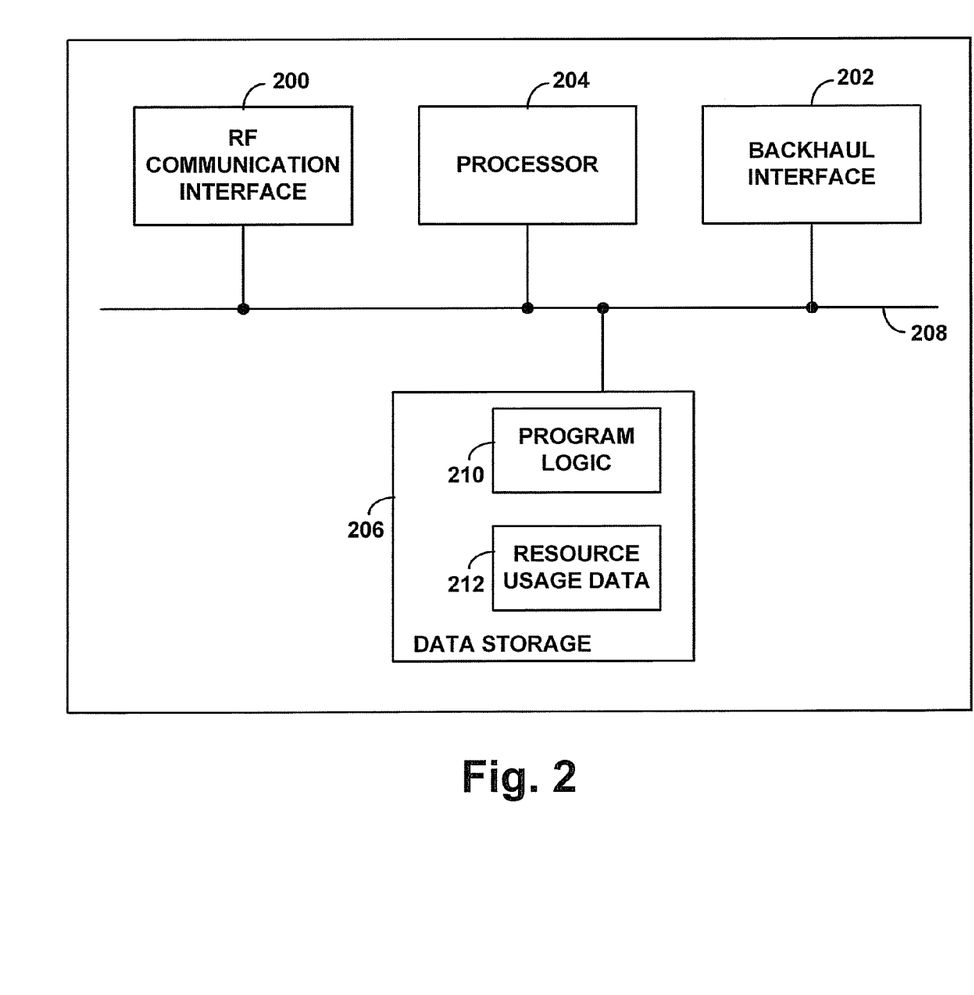
FIG. 2 is a simplified block diagram of a base station arranged to implement functions of the method.

FIG. 2 is a simplified block diagram showing functional components of an exemplary base station or any other entity arranged to carry out analogous functions. As shown, the base station includes an RF communication interface 200, a backhaul interface 202, a processor 204, and data storage 206, all of which may be communicatively linked together by a system bus, network, or one or more other connection mechanisms 208.

RF communication interface 200 may comprise one or more antenna structures, one or more power amplifiers, and associated equipment, for engaging in RF communication with mobile stations operating within the base station's coverage, according to one of the air interface protocols noted above for instance. Backhaul interface 202 may comprise any sort of communication link or mechanism enabling the base station to exchange signaling and bearer data with other RAN entities such as with BSC 50, or via BSC 50 with MSC 52 for instance. Processor 204 may comprise one or more processors (e.g., general purpose and/or special purpose processors), such as microprocessors for instance. And data storage 206 may comprise one or more volatile and/or non-volatile storage components, such as magnetic, optical, or organic storage components, integrated in whole or in part with processor 204.

As further shown, data storage 206 preferably contains program logic (e.g., machine language instructions) 210 executable by processor 204 to carry out various base station functions described herein. Further, data storage 206 preferably contains or can contain resource usage data 212, such as data indicating total resources, current resource usage, and thus the extent to which resources are or are not currently available, on a sector by sector basis, and data indicating whether each of one or more coverage areas of the base station is currently experiencing threshold congestion in terms of any or all of the resources noted above and/or other resources.

Figure 3:
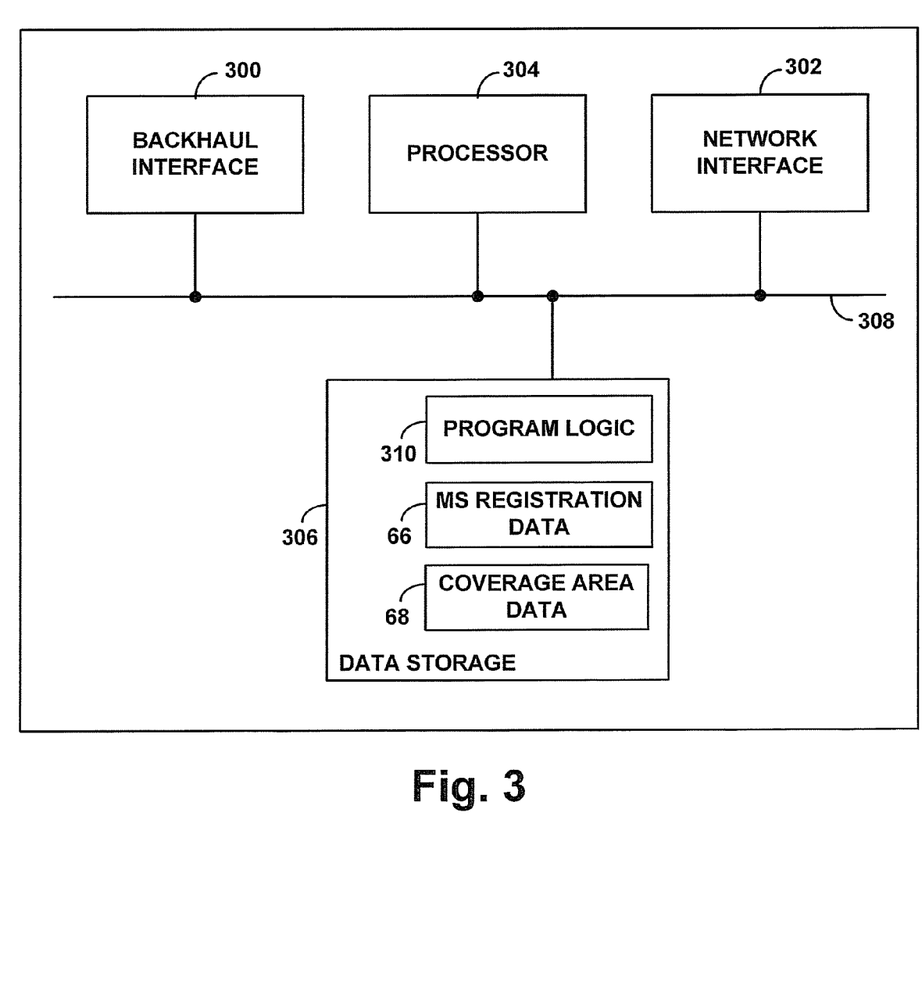
FIG. 3 is a simplified block diagram of a mobile switching center arranged to implement functions of the method.

FIG. 3 is next a simplified block diagram showing functional components of an exemplary MSC such as MSC 52 for instance, or any other entity arranged to carry out analogous functions. As shown, the MSC includes a backhaul interface 300, a network interface 302, a processor 304, and data storage 306, all of which may be communicatively linked together by a system bus, network, or one or more other connection mechanisms 308.

Backhaul interface 300 may comprise any sort of communication link or mechanism enabling the MSC to exchange signaling and bearer data with other RAN entities such as with BSC 50, or via BSC 50 with various base stations for instance. Network interface 302 may comprise any sort of interface enabling MSC 52 to exchange signaling and bearer data for PSTN communication and perhaps to access mobile station registration data 66 and/or coverage data 68 if the data is accessible in that manner.

Processor 304 may comprise one or more processors (e.g., general purpose and/or special purpose processors), such as microprocessors for instance. And data storage 306 may comprise one or more volatile and/or non-volatile storage components, such as magnetic, optical, or organic storage components, integrated in whole or in part with processor 304.

As further shown, data storage 306 preferably contains program logic (e.g., machine language instructions) 310 executable by processor 304 to carry out various MSC functions described herein. Further, data storage 306 may contain the mobile station registration data 66 and/or the coverage area data 68, such as a copy of part or all of that data, for convenient access by the MSC processor 304.

Figure 4:
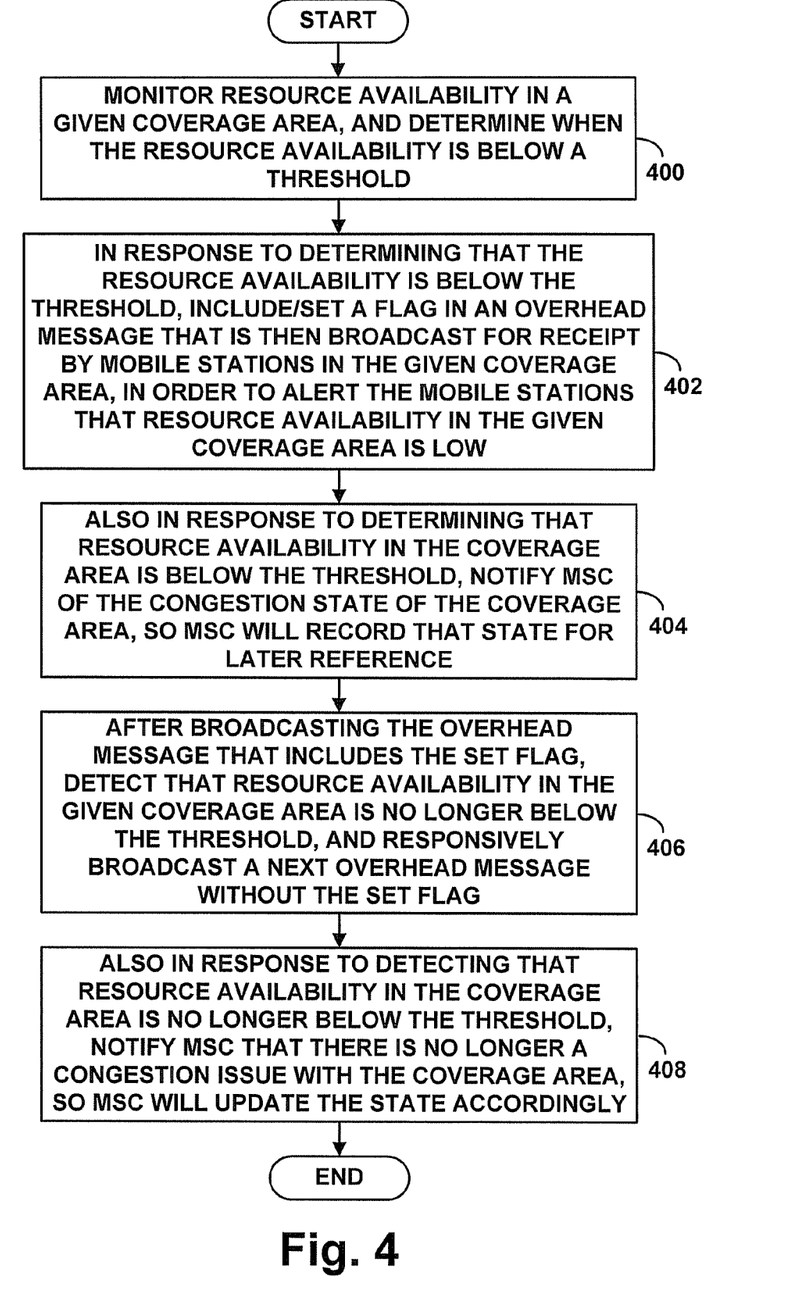
FIG. 4 is a flow chart depicting functions that can be carried out to provide a congestion indicator when a coverage area is experiencing threshold congestion.

As noted above, the present method provides for improved zone based paging by having a MSC send a page message (for a given page attempt) for broadcast in the zone where the target mobile station had last registered and in just the threshold-congested coverage areas of each zone adjacent to that zone, with possible further refinements. The method is most useful in a scenario where base stations in a RAN are set to broadcast a congestion indicator when they are experiencing a threshold level of congestion, as described above. FIG. 4 is a flow chart depicting functions that can be carried out to provide such a congestion indicator for a given coverage of a base station.

As shown in FIG. 4, at step 400, the method involves monitoring resource availability in a given coverage area, and determining when the resource availability is below a threshold. A base station may carry out this function by programmatically monitoring stored data that specifies what resources are currently in use and comparing the current use to the resources of the given coverage area. The resources may be managed by the base station or may be managed by some other entity in which case the base station may communicate with that entity or view shared data in order to determine the level of resource availability. The resource availability could be a measure with respect to one resource or cooperatively for multiple resources (e.g., access channel capacity, paging channel capacity, transmission power, traffic channels, hardware addresses, and/or one or more other resources) and could be specified as a fraction, percentage, or in any other manner desired. Further, a system that determines resources unavailability is above a threshold is the same as a system that determines resource availability is below a threshold.

At step 402, in response to determining that the resource availability is below the threshold, the method involves including/setting a flag (e.g., a Boolean expression such as a specially defined bit, such as a newly defined "access load flag" bit) in an overhead message that is then broadcast for receipt by mobile stations in the given coverage area, in order to alert the mobile stations that resource availability in the given coverage area is low. Optimally, the overhead message could be an access parameters message that is sent periodically, such as every 5.12 seconds for instance. That way, if the determination of low resource availability is made during the period since the transmission of the last access parameters message, the base station could set the flag in the next access parameters message. Mobile stations that receive that access parameters message may then programmatically read the flag (detect that it is set or present) and responsively not register in the given coverage area, if the mobile station would otherwise have done so.

At step 404, also in response to determining that resource availability in the coverage area is below the threshold, the method involves the base station sending a signal to the MSC 52 to notify the MSC 52 of the congestion state of the coverage area. Advantageously, MSC 52 would then record that state in the coverage area data 68 to facilitate the improved zone based paging. (In an alternative embodiment, the base station may simply maintain this data, and the MSC may later query various base stations in real-time to find out where to send a paging message in accordance with the improved method.)

At step 406, after broadcasting the overhead message that includes the set flag, the method then involves detecting that resource availability in the given coverage area is no longer below the threshold, and responsively broadcasting a next overhead message without the set flag. For instance, if sufficient sector resources become free during the example 5.12 second period after sending an access parameters message carrying the set flag, the base station may simply clear the flag (or, just the same, omit the flag) in the next access parameters message that it broadcasts. That way, mobile stations that receive that next access parameters message may then not detect the flag (i.e., would determine that the flag is not set, or just the same determine that it is not present, or not determine that it is present), and would therefore be free to register in the coverage area.

Further, at step 408, also in response to detecting that resource availability in the coverage area is no longer below the threshold, the method involves the base station sending a signal to the MSC 52 to notify the MSC 52 that there is no longer a congestion issue with the coverage area. The MSC 52 would then record that state change in the coverage area data 68.

To help understand the present method, consider a scenario where mobile station 64 is currently registered and operating in zone A, and the mobile station has begun moving into zone B, as shown in FIG. 1. As the mobile station moves into zone B, the mobile station may begin to detect a new zone ID (for zone B) in the overhead message broadcast by base station 18. However, assume that the coverage area 36 of base station 18 has been experiencing threshold congestion, and that base station 18 has therefore notified MSC 52 of the congestion state and is currently broadcasting a congestion indicator in coverage area 36. As a result of the congestion indicator, mobile station 64 would preferably not register in zone B even though it is detecting the new zone ID indicating zone B, emitted on coverage area 36.

Assume that mobile station 64 then moves along to coverage area 38 provided by base station 20 of zone B. But assume further that coverage area 38 has been experiencing threshold congestion as well, and that base station 20 has therefore notified MSC 52 of the congestion state and is currently broadcasting a congestion indicator in coverage area 38. Thus, once more, mobile station 64 would preferably not register in zone B even though it is again detecting the new zone ID indicating zone B, this time emitted on coverage area 38.

In turn, assume that the mobile station then moves along to coverage area 40 provided by base station 22 of zone B. And assume that coverage area 40 is not experiencing threshold congestion and that base station 24 is thus not broadcasting a congestion indicator in coverage area 40. At this point, since mobile station 64 is still registered in zone A and now detects the new zone ID of zone B, the mobile station will register in zone B, sending a registration message via the air in coverage area 40 to base station 22 for transmission in turn to MSC 52, and MSC 52 will update the mobile station registration data 66 to indicate that the mobile station is now registered in zone B.

Assume next that the mobile station moves along to coverage area 42 provided by base station 24 of zone B. And assume that coverage area 42 has been experiencing threshold congestion, so that base station 24 has notified MSC 52 of the congestion state and is currently broadcasting a congestion indicator in coverage area 42. In this case, the mobile station would detect the zone ID of zone B in the overhead message of coverage area 42. Given that the mobile station is already registered in zone B, the mobile station would thus not responsively register again in zone B.

Figure 5:
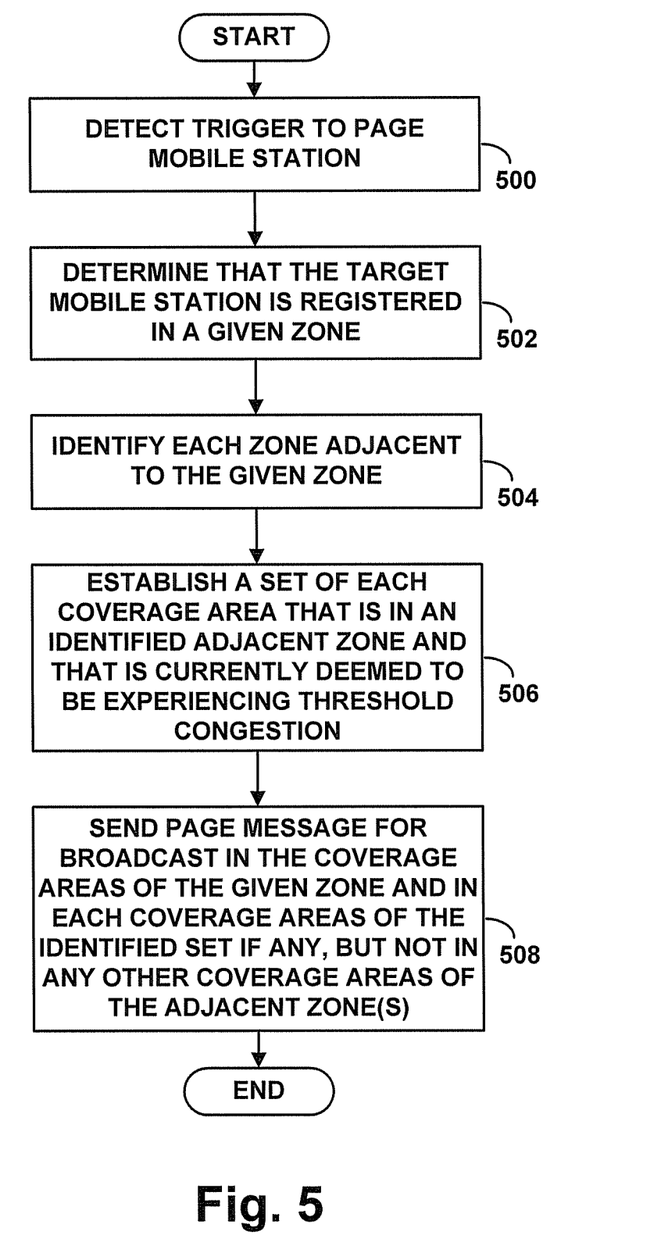
FIG. 5 is a flow chart depicting functions that can be carried out to provide zone based paging based on congestion.
Figure 6:
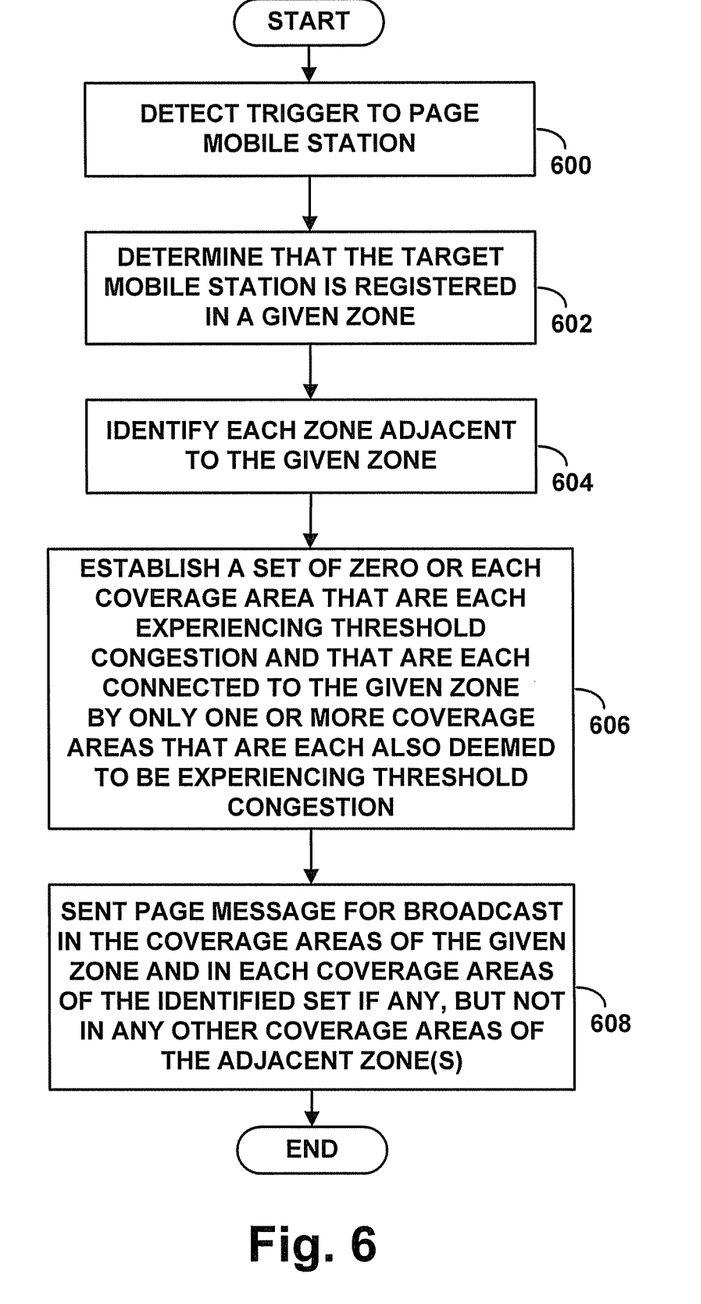
FIG. 6 is another flow chart depicting functions that can be carried out to provide zone based paging based on congestion.

Considering aspects of this scenario, FIGS. 5 and 6 are flow charts depicting functions that can be carried out in accordance with the present method to provide improved zone based paging. FIG. 5 depicts a simple implementation, in which the MSC attempts to page a mobile station in the mobile station's current registered zone and in each adjacent zone but limiting paging in the adjacent zone to just the coverage areas in the adjacent zone that are known to be experiencing threshold congestion. FIG. 6 depicts a more complex implementation, in which the MSC takes into consideration the adjacency between coverage areas so as to limit paging in an adjacent zone to just the threshold-congested coverage areas bordering the mobile station's current registered zone and threshold-congested coverage areas connected via only threshold-congested coverage areas to the bordering threshold-congested coverage areas, so as to take into consideration the travel path of a mobile station through the adjacent zone.

For both FIG. 5 and FIG. 6, assume that the mobile station is currently registered in zone A, even though the mobile station may have moved into coverage area 36 or coverage area 38 of zone B. Therefore, the mobile station has not yet moved into coverage area 40 of zone B and has thus not yet registered its presence in zone B.

Referring to FIG. 5, at step 500, MSC 52 detects a trigger to page mobile station 64. For instance, the MSC may receive a request to connect an incoming call to the mobile station or to wake up the mobile station to facilitate delivery of incoming data to the mobile station. The trigger to page the mobile station 64 may be for a first page attempt or some subsequent page attempt for a given communication, but detecting the trigger more generally involves the MSC encountering a need to attempt to page the mobile station, regardless of the reason. At issue is then which coverage areas the MSC should cause to broadcast the page.

At step 502, the MSC then refers to the mobile station registration data 66 and determines that the target mobile station 64 is registered in zone A. Further, at step 504, the MSC refers to the coverage area data 68 and identifies each zone adjacent to zone A, in this case just zone B (but in another arrangement potentially two or more adjacent zones). And at step 506, the MSC refers to the coverage area data 68 to identify each coverage area of adjacent zone B that is currently experiencing threshold congestion, thus defining a set of zero or more coverage areas in zone B that are currently experiencing threshold congestion. In this example, the set of coverage areas in zone B that are currently experiencing threshold congestion would be coverage areas 36, 38, and 40, corresponding with base stations 18, 20 and 24 respectively. But in another example scenario, it is possible that the MSC could determine that the set consists of just one coverage area, more than two coverage areas, or perhaps no coverage areas at all.

At step 508, the MSC then sends a page message for broadcast in the coverage areas of zone A and in each coverage areas of the identified set if any, but not in any other coverage areas of the adjacent zone(s). Thus, the MSC would send the page message for broadcast in coverage areas 32 and 34 of zone A (i.e., all of the coverage areas of zone A) and in just coverage areas 36, 38, and 42 of zone B. Advantageously, this limit on zone based paging in the adjacent zone(s) may help to reduce paging channel congestion in the adjacent zone(s) and accounts for the likelihood that, if the mobile station has actually entered an adjacent zone, the mobile station would have registered its presence in the new zone if it were not for the fact that one or more coverage areas of the new zone have blocked that registration due to threshold congestion. If it turns out that this page attempt fails, the MSC may then broaden the scope of its page effort for a next attempt.

Referring next to FIG. 6, at step 600, the MSC 52 similarly detects a trigger to page mobile station 64, and again, at issue is which coverage areas the MSC should involve in an attempt to page the mobile station. At step 602, the MSC then refers to the mobile station registration data 66 and similarly determines that the target mobile station 64 is registered in zone A. Further, at step 604, the MSC refers to the coverage area data 68 and similarly identifies each zone adjacent to zone A, in this case just zone B (but in another arrangement potentially two or more adjacent zones).

At step 606, the MSC then refers to the coverage area data 68 to identify each coverage area of adjacent zone B that is currently experiencing threshold congestion and that is directly adjacent to zone A or is connected to zone A by only one or more coverage areas of zone B that are each experiencing threshold congestion, thus defining a set of zero or more coverage areas in zone B that are each experiencing threshold congestion and that are each connected to zone A by only one or more coverage areas of zone B that are each also experiencing threshold congestion. Considering the example scenario described above, with zone B being the only adjacent zone, for instance, the MSC would consider the set to be coverage areas 36 and 38, but to not include coverage area 42. Coverage area 36 would be included in the set because it is directly adjacent to zone A, as indicated by the coverage area data 68 for instance. Coverage area 38 would be included in the set because coverage area 38 is connected to zone A through only one or more coverage areas of zone B that are each experiencing threshold congestion—namely in this case by coverage area 36. Coverage area 42, however, would not be included in the set, because coverage area is not connected to zone A through only one or more coverage areas of zone B that are each experiencing threshold congestion—since coverage area 40 sits in the line of travel between zone A and coverage area 42, and coverage area 40 is not experiencing threshold congestion.

It is thus understood that that the concept of a given coverage area being connected to zone A means that a path exists through which a mobile station can travel from zone A to the given coverage area via one or more other coverage areas, and the issue is whether those one or more other coverage areas are each experiencing threshold congestion.

If so, then the given coverage area would be included in the set. If not, then the given coverage area would not be included in the set.

By limiting the set of coverage areas in the adjacent zone(s) to be just those that are directly adjacent to zone A or that are connected to zone A by one only or more coverage areas that are each experiencing threshold congestion, the set represents each coverage area in the adjacent zone that the mobile station could have reached while passing from zone A through just coverage areas having threshold congestion. Considering that the mobile station would (or should) have registered in zone B if it had passed into and through a coverage area of zone B that was not experiencing threshold congestion, this limitation on the set helps to even better focus zone based paging.

At step 608, the MSC then sends a page message for broadcast in the coverage areas of zone A and in each coverage areas of the identified set if any, but not in any other coverage areas of the adjacent zone(s). Thus, in this example, the MSC would send the page message for broadcast in coverage areas 32 and 34 of zone A (i.e., all of the coverage areas of zone A) and in just coverage areas 36 and 38 of zone B. As in the example above, if this page attempt fails, the MSC may then broaden the scope of its page effort for a next attempt.

The above description has generally discussed "coverage areas," which, as noted above could take various forms. In expected practice, the coverage areas at issue may be cells or sectors. Depending on the type of coverage area and on numerous other possible factors, the method described above can be tailored to operate in a suitable manner.

By way of example, consider a scenario where a base station has multiple sectors and detects threshold congestion in any of its sectors. In that case, the base station may notify the MSC that the base station generally has high congestion, and the MSC may update the coverage area data to indicate that the base station is experiencing high congestion, keying the indication to a base station identifier for instance. When the MSC seeks to page a mobile station, the MSC may then send the page message to the base station as an adjacent zone cell site that is currently experiencing threshold congestion, possibly with further limitations as described above. In such a page message to the base station, the may provide an indication that the page message is an adjacent-zone-page type message (i.e., one being sent in a zone adjacent to the mobile station's currently zone of registration), and the base station may apply program logic to respond to that indication by emitting the page message on just its threshold congested sector(s). Alternatively, the base station may receive a page message with or without an indication of adjacent-zone-page type, and the base station may apply program logic to emit the page message generally in each of its sectors.

As another example, consider a scenario again where a base station has multiple sectors and detects threshold congestion in any of its sectors. In this example, the base station may notify the MSC that the base station has a threshold congestion state in the particular sector(s), identifying the sector(s) by sector ID for instance. The MSC may then update the coverage area data to indicate the threshold congestion state of the particular indicated sector(s). In turn, when the MSC seeks to page a mobile station, the MSC may carry out the analysis above with respect to sectors and/or cell sites and may send the page message to the base station with a specific directive for the base station to emit the page message in just the indicated sector(s). The base station may then receive the page message and apply program logic to emit it in only the indicated sector(s). Alternatively, the MSC may still direct the base station generally to emit the page message, and the base station may apply program logic to emit it in only the sector(s) of the base station that the base station knows to be currently experiencing threshold congestion.

An exemplary embodiment has been described above. Numerous changes are possible or will become possible in the future, however, while remaining within the scope of the claims.

What is claimed is:

1. A method of paging in a wireless communication system, wherein the system defines a plurality of paging zones each having a plurality of coverage areas, the method comprising:

encountering a trigger to page a mobile station, wherein encountering the trigger to page the mobile station comprises encountering a need to engage in a first attempt to page the mobile station for a given communication; and responsive to the trigger, (a) determining that the mobile station is registered in a given paging zone, (b) identifying at least one paging zone adjacent to the given paging zone, and (c) for the first attempt, paging the mobile station in the given paging zone and in each coverage area of the at least one identified adjacent paging zone that is deemed to be experiencing threshold congestion but not in any coverage area of the at least one identified adjacent paging zone that is not deemed to be experiencing threshold congestion, wherein threshold congestion of a coverage area comprises threshold low resource availability in the coverage area, wherein the method further comprises, for each particular coverage area of each paging zone: (i) monitoring resource availability in the particular coverage area, (ii) determining whether resource availability for the particular coverage area is below a threshold, (iii) responsive to determining that the resource availability in the particular coverage area is below the threshold, broadcasting an overhead message for receipt by mobile stations in the particular coverage area as an indication that the particular coverage area is experiencing threshold congestion, and to cause any mobile station that would otherwise engage in paging zone registration as a result of entering the particular coverage area to not register as a result of entering the particular coverage area, and (iv) responsive to determining that the resource availability in the particular coverage area is below the threshold, setting a flag to indicate that the particular coverage area is experiencing threshold congestion, and wherein paging the mobile station in each coverage area of the at least one identified adjacent paging zone that is deemed to be experiencing threshold congestion but not in any coverage area of the at least one identified adjacent paging zone that is not deemed to be experiencing threshold congestion comprises referring to the flag to determine that the particular coverage area is experiencing threshold congestion and responsively paging the mobile station in at least the particular coverage area.

2. The method of claim 1, wherein the resource availability defines availability of one or more resources selected from the group consisting of access channel capacity, paging channel capacity, transmission power, traffic channels, and hardware addresses.

3. The method of claim 1, wherein the overhead message is an access parameters message, wherein broadcasting the overhead message for receipt by the mobile stations in the particular coverage area as an indication that the particular coverage area is experiencing threshold congestion comprises including a congestion-indicator in the access parameters message.

4. The method of claim 1, further comprising:
after broadcasting the overhead message as an indication that the particular coverage area is experiencing threshold congestion, detecting that resource availability in the given coverage area is no longer below the threshold, and responsively broadcasting a next overhead message that does not indicate that the particular coverage area is experiencing threshold congestion.

5. The method of claim 4, wherein broadcasting the next overhead message that does not indicate that the particular coverage area is experiencing threshold congestion comprises broadcasting the next overhead with an indication that the particular coverage area is not experiencing threshold congestion.

6. A method of paging in a wireless communication system, wherein the system defines a plurality of paging zones each having a plurality of coverage areas, the method comprising:
encountering a trigger to page a mobile station, wherein encountering the trigger to page the mobile station comprises encountering a need to engage in a first attempt to page the mobile station for a given communication; and
responsive to the trigger, (a) determining that the mobile station is registered in a given paging zone, (b) identifying at least one paging zone adjacent to the given paging zone, (c) identifying a set of one or more coverage areas in the at least one identified adjacent paging zone that are each deemed to be experiencing threshold congestion and that are each connected to the given paging zone by one or more coverage areas that are each also deemed to be experiencing threshold congestion, and (d) for the first attempt, paging the mobile station in the given paging zone and in the identified set of one or more coverage areas but not in any other coverage areas of the at least one identified adjacent paging zone,
wherein threshold congestion of a coverage area comprises threshold low resource availability in the coverage area,
wherein the method further comprises, for each particular coverage area of each paging zone: (i) monitoring resource availability in the particular coverage area, (ii) determining whether resource availability for the particular coverage area is below a threshold, (iii) responsive to determining that the resource availability in the particular coverage area is below the threshold, broadcasting an overhead message for receipt by mobile stations in the particular coverage area as an indication that the particular coverage area is experiencing threshold congestion, and to cause any mobile station that would otherwise engage in paging zone registration as a result of entering the particular coverage area to not register as a result of entering the particular coverage area, and (iv) responsive to determining that the resource availability in the particular coverage area is below the threshold, setting a flag to indicate that the particular coverage area is experiencing threshold congestion, and
wherein identifying the set of one or more coverage areas in the at least one identified adjacent paging zone that are each deemed to be experiencing threshold congestion and that are each connected to the given paging zone by one or more coverage areas that are each also deemed to be experiencing threshold congestion comprises referring to the flag to determine that the particular coverage area is experiencing threshold congestion.

7. The method of claim 6, wherein the resource availability defines availability of one or more resources selected from the group consisting of access channel capacity, paging channel capacity, transmission power, traffic channels, and hardware addresses.

8. The method of claim 6, wherein the overhead message is an access parameters message, wherein broadcasting the overhead message for receipt by the mobile stations in the particular coverage area as an indication that the particular coverage area is experiencing threshold congestion comprises including a congestion-indicator in the access parameters message.

9. The method of claim 6, further comprising:
after broadcasting the overhead message as an indication that the particular coverage area is experiencing threshold congestion, detecting that resource availability in the given coverage area is no longer below the threshold, and responsively broadcasting a next overhead message that does not indicate that the particular coverage area is experiencing threshold congestion.

* * * * *